US012667102B2

(12) United States Patent (10) Patent No.: US 12,667,102 B2
Mundhra et al. (45) Date of Patent: Jun. 30, 2026

(54) HERBICIDAL COMPOSITIONS COMPRISING OF PHENYLPYRAZOLINE AND TRIAZOLINONE COMPOUNDS

(71) Applicant: WILLOWOOD CHEMICALS LIMITED, New Delhi (IN)

(72) Inventors: Parikshit Mundhra, New Delhi (IN); Jitendra Mohan, New Delhi (IN)

(73) Assignee: WILLOWOOD CHEMICALS LIMITED, New Delhi (IN)

( * ) Notice: Subject to any disclaimer, the term of this patent is extended or adjusted under 35 U.S.C. 154(b) by 311 days.

(21) Appl. No.: 18/278,580

(22) PCT Filed: Feb. 25, 2022

(86) PCT No.: PCT/IN2022/050167

§ 371 (c)(1),
(2) Date: Aug. 23, 2023

(87) PCT Pub. No.: WO2022/180647

PCT Pub. Date: Sep. 1, 2022

(65) Prior Publication Data

US 2024/0122183 A1 Apr. 18, 2024

(30) Foreign Application Priority Data

Feb. 26, 2021 (IN) .............................. 202111008240

(51) Int. Cl.
| | |
|---|---|
| *A01N 43/90* | (2006.01) |
| *A01N 25/04* | (2006.01) |
| *A01N 25/14* | (2006.01) |
| *A01N 43/653* | (2006.01) |
| *A01N 43/76* | (2006.01) |
| *A01N 47/30* | (2006.01) |
| *A01P 13/00* | (2006.01) |

(52) U.S. Cl.
CPC .............. *A01N 43/90* (2013.01); *A01N 25/04* (2013.01); *A01N 25/14* (2013.01); *A01N 43/653* (2013.01); *A01N 43/76* (2013.01); *A01N 47/30* (2013.01); *A01P 13/00* (2021.08)

(58) Field of Classification Search
CPC ...... A01N 43/90; A01N 25/04; A01N 43/653; A01N 25/14; A01N 43/76; A01N 47/30; A01P 13/00
See application file for complete search history.

(56) References Cited

FOREIGN PATENT DOCUMENTS

| | | | |
|---|---|---|---|
| CN | 105284846 A | 2/2016 | |
| EP | 2700635 A1 * | 2/2014 | ............. A01N 43/56 |
| WO | WO-2012053652 A1 * | 4/2012 | ............. A01N 43/80 |
| WO | WO-2012123408 A1 | 9/2012 | |
| WO | WO-2019150233 A1 | 8/2019 | |

OTHER PUBLICATIONS

International Search Report from Corresponding PCT Application No. PCT/IN2022/050167 dated May 26, 2022.
Written Opinion of the International Searching Authority from Corresponding PCT Application No. PCT/IN2022/050167 dated May 26, 2022.
Pawan Katara et al, (2015) "Influence of pinoxaden in combination with other herbicides on nutrient depletion by weeds in wheat", Indian Journal of Weed Science, 47(4) :371-375.
International Search Report from corresponding PCT Application PCT/IN2022/050161, dated May 13, 2022.
Written Opinion from corresponding PCT Application No. PCT/IN2022/050161, dated May 13, 2022.

* cited by examiner

*Primary Examiner* — Robert A Wax
*Assistant Examiner* — John W Lippert, III
(74) *Attorney, Agent, or Firm* — Harness Dickey & Pierce P.L.C.

(57) ABSTRACT

The present provides a synergistic herbicidal composition comprising Pinoxaden, Carfentrazone-ethyl and at least one herbicidal compound selected from Fenoxaprop-p-ethyl or Isoproturon, and uses thereof.

7 Claims, No Drawings

HERBICIDAL COMPOSITIONS COMPRISING OF PHENYLPYRAZOLINE AND TRIAZOLINONE COMPOUNDS

FIELD OF THE INVENTION

The present invention relates to herbicidal compositions comprising of phenylpyrazoline and triazolinone compounds and at least one another herbicidal compound. More particularly, the present invention relates to a synergistic herbicidal composition comprising Pinoxaden, Carfentrazone-ethyl and at least one herbicidal compound selected from Fenoxaprop-p-ethyl or Isoproturon.

BACKGROUND OF THE INVENTION

The crop protection from weeds and other vegetation which inhibit crop growth is a constantly recurring problem in agriculture. Therefore, the control of weeds or unwanted plants is economically important for the crop productivity. Researchers in the field of synthetic chemistry have produced an extensive variety of chemicals and chemical formulations as solo or combination of active ingredients for the control of such weeds or unwanted plants. Chemical herbicides of many types have been disclosed in the literature and a large number are in commercial use.

Nowadays, little seed canary grass (*Phalaris minor*) is a serious weed of irrigated wheat in India that has developed resistance against most of the available herbicidal control measures. In order to reduce the risk from increased number of herbicide resistant strains, mixtures of different active compounds are nowadays employed for controlling weeds or unwanted plants. By combining different active compounds having different mechanisms of action, it is possible to ensure efficient and wide spectrum control of weeds over a relatively longer period of time and preventing development of resistance. However, this requires the continued development of an effective composition with different active compounds, so as to avoid selection to the particular mechanism of action.

Therefore, there exists a need in the art to develop an herbicidal composition which is stable, synergistic, broad spectrum, environmentally safe, and more effective in control of weeds in crops. The herbicidal compositions must show a broader scope of activity to avoid or to prevent the development of resistant varieties of weeds to the active ingredients or to the mixtures of known active ingredients used by farmer while minimising the doses of chemicals sprayed in the agricultural fields.

As a solution to the above mentioned problems, the inventors of the present invention surprisingly found that composition comprising Pinoxaden, Carfentrazone-ethyl and at least one herbicidal compound selected from Fenoxaprop-p-ethyl or Isoproturon provides effective control of wide range of weeds or undesired plants.

SUMMARY OF THE INVENTION

Accordingly, the present invention provides a synergistic herbicidal composition comprising Pinoxaden, Carfentrazone-ethyl and at least one herbicidal compound selected from Fenoxaprop-p-ethyl or Isoproturon and one or more excipients.

In an embodiment, the synergistic herbicidal composition comprises of Pinoxaden in the range of 1-12.5% w/w, Carfentrazone-ethyl in the range of 1-5% w/w, and at least one herbicide compound selected from Fenoxaprop-p-ethyl in the range of 5-20% w/w and Isoproturon in the range of 40-60% w/w, and one or more excipients.

In another embodiment, the present invention provides a synergistic herbicidal composition selected from the group comprising:

Pinoxaden in an amount of 4.5% w/w, Carfentrazone-ethyl in an amount of 2% w/w, Fenoxaprop-p-ethyl in an amount of 10% w/w and one or more excipients, Pinoxaden in an amount of 9% w/w, Carfentrazone-ethyl in an amount of 4% w/w Fenoxaprop-p-ethyl in an amount of 20% w/w and one or more excipients, Pinoxaden in an amount of 4.5% w/w, Carfentrazone-ethyl in an amount of 2% w/w and Isoproturon in an amount of 50% w/w and one or more excipients.

In one another embodiment, the composition of the present invention is formulated as Capsule suspension (CS), Dispersible concentrate (DC), Dustable powder (DP), Powder for dry seed treatment (DS), Emulsifiable concentrate (EC), Emulsifiable granule (EG), Emulsion water-in-oil (EO), Emulsifiable powder (EP), Emulsion for seed treatment (ES), Emulsion oil-in-water (EW), Flowable concentrate for seed treatment (FS), Granules (GR), Micro-emulsion (ME), Oil-dispersion (OD), Oil miscible flowable concentrate (OF), Oil miscible liquid (OL), Oil dispersible powder (OP), Suspension concentrate (SC), Suspension concentrate for direct application (SD), Suspo-emulsion (SE), Water soluble granule (SG), Soluble concentrate (SL), Spreading oil (SO), Water soluble powder (SP), Water soluble tablet (ST), Ultra-low volume (ULV) suspension, Tablet (TB), Ultra-low volume (ULV) liquid, Water dispersible granules (WG), Wettable powder (WP), Water dispersible powder for slurry seed treatment (WS), Water dispersible tablet (WT), a mixed formulation of CS and SC (ZC) or a mixed formulation of CS and SE (ZE), a mixed formulation of CS and EW (ZW). In a preferred embodiment, the composition is formulated as microemulsion (ME) and wettable powder (WP).

In an embodiment, the excipient used in the present invention is selected from the group comprising of dispersing agent present in an amount in the range from 1 to 10% w/w, wetting agent is present in an amount in the range from 1 to 10% w/w, emulsifier is present in an amount in the range from 5 to 15% w/w, defoamer is present in an amount in the range from 0.1 to 5% w/w, safener is present in an amount in the range from 1 to 5% w/w, co-solvent is present in an amount in the range from 5 to 10% w/w, at least one of solvent or filler present in an amount of quantity sufficient to make 100% w/w formulation.

In another embodiment, the dispersing agent is selected from the group comprising of sodium salt of naphthalene sulphonate condensate, sulfonated aromatic polymer sodium salt, sodium polycarboxylate, ethanesulfonic acid, 2-[methyl [(9Z)-1-oxo-9-octadecenyl]amino]-sodium salt, sodium 2-(methyloleoylamino)ethane-1-sulphonate, amine salt of phosphate tristyryl phenol ethoxylated, acrylic copolymer, graft copolymer, salt of naphthalene sulphonate, naphthalene sulfonate formaldehyde condensate, phosphate ester, salt of polycarboxylate, alcohol block copolymer, ethoxylated polyarylphenol phosphate ester or a combination thereof. The wetting agent is selected from the group comprising of sodium lauryl sulphate, sodium alkyl naphthalene sulfonate blend, sodium alkylnaphthalenesulfonate, sodium isopropyl naphthalene sulfonate, sodium dioctylsulfosuccinate, ethoxylated polyarylphenol phosphate ester, dioctyl sulphosuccinate, non-ionic ethoxylate or a combination thereof. The emulsifier is selected from the group comprising of castor oil ethoxylate, calcium dodecylbenzene sulfonate, blend of anionic-nonionic emulsifiers, tristyryl phenol, polyalkylene oxide block copolymer, high molecular weight polymer PEG-10 PPG-5 cetyl phosphate, ethylene oxide (EO)-polyethylene oxide (PO) block copolymer, non-ionic ethoxylated emulsifier, or a combination thereof. The defoamer is selected from the group comprising of silicon emulsion, dimethyl polysiloxane emulsion, polysiloxane emulsion or a combination thereof. The safener is selected from the group comprising of AD67, benoxacor, cloquintocet-mexyl, cyometrinil, cyprosulfamide, dichlormid, fenchlorazole-ethyl, flurazole, fluxofenim, furilazole, isoxadifen-ethyl, mefenpyr-diethyl or a combination thereof. The co-solvent is selected from the group of comprising 2-ethyl hexanol, n-butanol, dimethylsulfoxide, N-methyl-2-pyrrolidone, cyclohexanone or a combination thereof. The solvent is selected from the group comprising of naphtha, xylene, decanamide, solvent C9, water or a combination thereof. The filler is selected from the group comprising of silica and china clay or a combination thereof.

DETAILED DESCRIPTION OF THE INVENTION

The definitions provided herein for the terminologies used in the present disclosure are for illustrative purpose only and in no manner limit, the scope of the present invention disclosed in the present disclosure.

Unless defined otherwise, all technical and scientific terms used herein have the same meaning as commonly understood by one of ordinary skill in the art to which the invention pertains. Although other methods and materials similar, or equivalent, to those described herein can be used in the practice of the present invention, the preferred materials and methods are described herein.

As used herein, the term "composition" or "formulation" can be used interchangeably, unless stated otherwise, is meant to encompass, and are not limited to, compositions or formulations containing the combination of Pinoxaden, Carfentrazone-ethyl and at least one herbicidal compound selected from Fenoxaprop-p-ethyl or Isoproturon or its derivative thereof.

The expression of various quantities in terms of "% w/w" or "%" means the percentage by weight, relative to the weight of the total solution or composition unless otherwise specified.

The term "active ingredient" "(a.i.)" or "active agent" used herein refers to that component of the composition responsible for control of weeds or undesired plants.

As used herein, the term "Pinoxaden" encompasses its agrochemically acceptable salt(s), derivative(s) or any other modified form of Pinoxaden. Pinoxaden belongs to the class of phenylpyrazoline herbibicide. It acts by inhibition of acetyl CoA carboxylase.

As used herein, the term "Carfentrazone-ethyl" encompasses its agrochemically acceptable salt(s), ester(s) such as Carfentrazone-ethyl, derivative(s) or any other modified form of Carfentrazone-ethyl. Carfentrazone-ethyl belongs to the class of triazolinone herbicide. It acts by inhibition of protoporphyrinogen oxidase.

As used herein, the term "Fenoxaprop-p-ethyl" encompasses its agrochemically acceptable salt(s), acids such as Fenoxaprop, Fenoxaprop-p-ethyl, derivative(s) or any other modified form of Fenoxaprop-p-ethyl. Fenoxaprop-p-ethyl belongs to the class of aryloxyphenoxypropionate. It acts by acetyl CoA carboxylase inhibition.

As used herein, the term "Isoproturon" encompasses its agrochemically acceptable salt(s), derivative(s) or any other modified form of Isoproturon. Isoproturon belongs to the class of urea herbicide. It acts by inhibition of photosystem II.

The present invention provides a composition comprising of Pinoxaden, Carfentrazone-ethyl and at least one herbicidal compound selected from Fenoxaprop-p-ethyl or Isoproturon and one or more excipients. It has been surprisingly found that the composition of the present invention not only provides effective control of weeds or undesired plants but also such combination is synergistic in nature.

The composition according to the present invention comprises of Pinoxaden in an amount in the range from 1-12.5% w/w, Carfentrazone-ethyl in an amount in the range from 1-5% w/w, and at least one herbicidal compound in the range from 5 to 60% w/w. In an aspect, at least one herbicidal compound is selected from Fenoxaprop-p-ethyl or Isoproturon. In another aspect, Fenoxaprop-p-ethyl is present in an amount in the range from 5-20% w/w. In one another aspect, Isoproturon is present in an amount in the range from 40-60% w/w.

In a preferred aspect, the composition of the present invention is selected from a group comprising of:
   4.5% w/w of Pinoxaden, 2% w/w of Carfentrazone-ethyl, 10% w/w of Fenoxaprop-p-ethyl and one or more excipients.
   9% w/w of Pinoxaden, 4% w/w of Carfentrazone-ethyl and 20% w/w of Fenoxaprop-p-ethyl and one or more excipients.
   4.5% w/w of Pinoxaden, 2% w/w of Carfentrazone-ethyl and 50% w/w of Isoproturon and one or more excipients.

The composition of the present invention is formulated as Capsule suspension (CS), Dispersible concentrate (DC), Dustable powder (DP), Powder for dry seed treatment (DS), Emulsifiable concentrate (EC), Emulsifiable granule (EG), Emulsion water-in-oil (EO), Emulsifiable powder (EP), Emulsion for seed treatment (ES), Emulsion oil-in-water (EW), Flowable concentrate for seed treatment (FS), Granules (GR), Micro-emulsion (ME), Oil-dispersion (OD), Oil miscible flowable concentrate (OF), Oil miscible liquid (OL), Oil dispersible powder (OP), Suspension concentrate (SC), Suspension concentrate for direct application (SD), Suspo-emulsion (SE), Water soluble granule (SG), Soluble concentrate (SL), Spreading oil (SO), Water soluble powder (SP), Water soluble tablet (ST), Ultra-low volume (ULV) suspension, Tablet (TB), Ultra-low volume (ULV) liquid, Water dispersible granules (WG), Wettable powder (WP), Water dispersible powder for slurry seed treatment (WS), Water dispersible tablet (WT), a mixed formulation of CS and SC (ZC) or a mixed formulation of CS and SE (ZE), a mixed formulation of CS and EW (ZW), preferably formulated as ME and WP.

The composition of the present invention comprises of one or more excipients selected from dispersing agent, wetting agent, emulsifier, defoamer, safener, filler, solvent. In another aspect, the composition is formulated as ME and comprises of one or more excipients selected from emulsifier, safener and solvent. In one another aspect, the composition is formulated as WP and comprises of one or more excipients selected from dispersing agent, wetting agent, defoamer and filler. The composition may further comprise of other excipients as will be required in a particular type of formulation, including, but not limited to, anti-freeze agent, thickener, biocide, monomer, pH adjuster and stabilizer.

It is generally observed that solid particles in a liquid undergo spontaneous aggregation to form lumps. Hence, it is recommended to add a dispersing agent which prevents agglomeration of solid particles and keep them suspended in fluid. Accordingly, the composition of the present invention contains dispersing agent such as sodium salt of naphthalene sulphonate condensate, sulfonated aromatic polymer sodium salt, sodium polycarboxylate, ethanesulfonic acid, 2-[methyl [(9Z)-1-oxo-9-octadecenyl]amino]-sodium salt, sodium 2-(methyloleoylamino)ethane-1-sulphonate, amine salt of phosphate tristyryl phenol ethoxylated, acrylic copolymer, graft copolymer, salt of naphthalene sulphonate, naphthalene sulfonate formaldehyde condensate, phosphate ester, salt of polycarboxylate, alcohol block copolymer, ethoxylated polyarylphenol phosphate ester or a combination thereof and present in an amount in the range from 1 to 10% w/w.

Wetting is the first stage of dispersion, in which air surrounding the granular/powder composition is substituted with water. Wetting of the composition with water cannot occur if the surface tension of the liquid is very high. Hence, it is recommended to add a wetting agent to the composition to facilitate the process of dispersion of the granules/powder in the liquid. Non-limiting examples of wetting agents used herein are sodium lauryl sulphate, sodium alkyl naphthalene sulfonate blend, sodium alkylnaphthalenesulfonate, sodium isopropyl naphthalene sulfonate, sodium dioctylsulfosuccinate, ethoxylated polyarylphenol phosphate ester, dioctyl sulphosuccinate, non-ionic ethoxylate or a combination thereof and present in an amount in the range from 1 to 10% w/w.

An emulsifier is a kind of surfactant. It helps to prevent the droplets of the dispersed phase of an emulsion from flocculating or coalescing in the emulsion. It can be or include a cationic, zwitterionic or a non-ionic emulsifier. Suitable emulsifier used herein, are castor oil ethoxylate, calcium dodecylbenzene sulfonate, proprietary blend of anionic-nonionic emulsifiers, tristyryl phenol, polyalkylene oxide block copolymer, high molecular weight polymer PEG-10 PPG-5 cetyl phosphate, ethylene oxide (EO)-polyethylene oxide (PO) block copolymer, non-ionic ethoxylated emulsifier, or a combination thereof and present in an amount in the range from 5 to 15% w/w.

A defoamer is generally added to the composition, as foam formation prevents the efficient filling of a container. Suitable defoamer used herein, but not limited to, silicon emulsion, dimethyl polysiloxane emulsion, polysiloxane emulsion or a combination thereof and present in an amount in the range from 0.1 to 5% w/w.

A safener is to be understood as meaning a compound which eliminates or reduces the phytotoxic properties of herbicide in respect to useful plants, without substantially reducing the herbicidal activity against harmful plants. Non limiting examples of safeners that can be employed in present invention are AD67, benoxacor, cloquintocet-mexyl, cyometrinil, cyprosulfamide, dichlormid, dicyclonon, dietholate, fenchlorazole-ethyl, fenclorim, flurazole, fluxofenim, furilazole, isoxadifen-ethyl, mefenpyr-diethyl, mephenate, metcamifen, naphthalic anhydride, oroxabetrinil, or a combination thereof and is present in an amount in the range from 1 to 5% w/w.

The co-solvent used in the composition of the present invention is selected from 2-ethyl hexanol, n-butanol, dimethyl sulfoxide (DMSO), N-Methyl-2-pyrrolidone, cyclohexanone or a combination thereof and is present in an amount in the range from 5 to 10% w/w. Non limiting examples of solvents that can be employed in present invention are naphtha, xylene, decanamide, solvent C9, water or a combination thereof and is present in an amount of quantity sufficient to make 100% w/w formulation.

Other non-limiting examples of co-solvent/solvent that may be used in the present invention are alcohols such as ethanol, propanol, n-octanol, isopropanol ethylene glycol, diethylene glycol, propylene glycol, polyethylene glycol, glycerine; polyol ethers such as ethylene glycol monopropyl ether, diethylene glycol monomethyl ether, dipropylene glycol dimethyl ether; ketones such as acetone, methyl ethyl ketone, methyl isobutyl ketone; ethers such as dipropyl ether, dioxane, tetrahydrofuran; aliphatic hydrocarbons such as normal paraffin, isoparaffin, kerosene, mineral oil; aromatic hydrocarbons such as toluene, naphthalene, solvent C10, solvent C12, solvesso 100, solvesso 150, solvesso 200; chlorinated aliphatic or aromatic hydrocarbons such as chlorobenzene, chloroethylene, methylene chloride; esters such as ethyl acetate, diisopropyl phthalate, dimethyl adipate, methyl oleate, methyl tallowate; lactones such as gamma-butyrolactone; amides such as dimethylformamide, N-octylpyrrolidone, N,N-dimethyldecanamide; nitriles such as acetonitrile.

A filler is added to the composition to improve the handling and storage characteristics of the composition. Fillers also add mass and/or volume to the active ingredient in order to facilitate precise measurement of the doses. Suitable fillers that may be used in the composition of the present invention include, but not limited to, bentonite clay, china clay, silica, kaolin and diatomaceous earth. The filler may be used alone or in combination and is present in an amount quantity sufficient to make 100% w/w formulation.

The composition of the present invention can be applied by any one of the methods selected from atomization, spreading, dusting, spraying, diffusion, immersion, irrigation, injection, mixing, sprinkling (water immersion), foaming, dressing, coating, blasting, fumigation, smoking, smog and painting.

In an embodiment, the present invention provides a process for the preparation of a ME formulation which comprises mixing of solvent, emulsifier, safener, Pinoxaden, Carfentrazone-ethyl, one of Fenoxaprop-p-ethyl or Isoproturon.

In another embodiment, the present invention provides a process for the preparation of a WP formulation which comprises a) mixing of dispersing agent, wetting agent, Pinoxaden, Carfentrazone-ethyl, one of Fenoxaprop-p-ethyl or Isoproturon, defoamer and filler, b) milling in a suitable air jet mill and c) mixing homogeneously in a blender to obtain the formulation.

In another embodiment, the composition of the present invention is effective in the management of post-emergence of monocotyledonous and dicotyledonous weeds. In an embodiment of the present invention, the composition used for the post-emergence control of variety of crops, including but not limited to, in cereals namely wheat, maize, sorghum, rice, barley, oats, triticale etc., soybeans, peanuts, cotton, onions, garlic, asparagus, sugarcane, ornamentals, rubber, as well as protecting crops from herbicidal injury caused by any of the individual components.

The rate of application amount varies depending on, for example, the blending ratio of active ingredients, meteorological condition, dosage form, application time, application method, application place, weed to be controlled, and target crop, in ordinary cases.

The synergistic composition of the present invention provides a number of other advantages:

Increased efficacy in comparison to the other formulations tested during the trial.

Economically beneficial to the farmers as it provides better yield of the crop with reduction in the number of sprays.

Reduced possibility of hazards to the farmers due to occupational exposure because of reduction in the number of sprays.

Is storage stable.

Is non-phytotoxic.

Environmental friendly.

The embodiments of the present invention are more particularly described in the following examples that are intended as illustrations only, since numerous modifications and variations within the scope of the present invention will be apparent to those of skill in the art. Unless otherwise noted, all parts, percentages and ratios reported in the following examples are on a weight basis and all excipients used in the examples were obtained or are available from the chemical suppliers.

EXAMPLES

The synergistic herbicidal composition of the present invention comprising Pinoxaden, Carfentrazone-ethyl and one of Fenoxaprop-p-ethyl or Isoproturon in ME and WP form is provided in example 1 to 10. The unit of each component of the composition are expressed in "% w/w" i.e. the percentage by weight, relative to the weight of the total solution or composition.

Examples 1 to 5

TABLE 1

| Sr. No. | Ingredients | Eg: 1 % w/w | Eg: 2 % w/w | Eg: 3 % w/w | Eg: 4 % w/w | Eg: 5 % w/w |
|---|---|---|---|---|---|---|
| | Pinoxaden + Carfentrazone-ethyl + Fenoxaprop-p-ethyl ME | | | | | |
| 1 | Pinoxaden Technical (100% Basis) | 1 | 2 | 4.5 | 9 | 10 |
| 2 | Carfentrazone ethyl Technical (100% Basis) | 5 | 1 | 2 | 4 | 4.5 |
| 3 | Fenoxaprop p-ethyl Technical (100% Basis) | 20 | 10 | 10 | 20 | 5 |
| 4 | Safener (AD67, benoxacor, cloquintocet-mexyl, cyometrinil, cyprosulfamide, dichlormid, fenchlorazole-ethyl, flurazole, fluxofenim, furilazole, isoxadifen-ethyl, mefenpyr-diethyl) | 3 | 3 | 3 | 3 | 3 |
| 5 | Non-ionic Emulsifiers | 8 | 8 | 10 | 10 | 8 |
| 6 | Anionic Emulsifiers | 4 | 4 | 5 | 5 | 4 |
| 7 | Co-Solvent (2-ethyl hexanol, n-butanol, dimethyl sulfoxide, N-methyl-2-pyrrolidone, Cyclohexanone etc.) | 12 | 10 | 10 | 10 | 10 |
| 8 | Solvent (Naphtha, Xylene, Decanamide, C9) | Q.S. to make 100% | Q.S. to make 100% | Q.S. to make 100% | Q.S. to make 100% | Q.S. to make 100% |
| | Total | 100 | 100 | 100 | 100 | 100 |

QS: quantity sufficient required to make 100% w/w formulation

Process of Preparing Synergistic Herbicidal Composition Comprising Pinoxaden, Carfentrazone-ethyl and Fenoxaprop-p-ethyl ME Table 2 provides quantities of active ingredients and raw material charged to prepare the synergistic composition of the present invention in ME form. In table 2, active ingredients Pinoxaden, Carfentrazone-ethyl, Fenoxaprop-p-ethyl are in technical grade with 98%, 95% and 97% purity respectively. Particularly example 3 and 4 corresponds to column A and B in table 2.

TABLE 2

| Sr. No. | Ingredients | A Quantity (g) | B Quantity (g) |
|---|---|---|---|
| | Quantities of active ingredients and raw material charged | | |
| 1 | Pinoxaden Technical (98% Basis) | 4.60 | 9.19 |
| 2 | Carfentrazone-ethyl Technical (95% Basis) | 2.11 | 4.22 |
| 3 | Fenoxaprop p-ethyl Technical (97% Basis) | 10.31 | 20.62 |
| 4 | Mefenpyr diethyl | 3.00 | 3.00 |
| 5 | Castor oil ethoxylate | 10.00 | 10.00 |
| 6 | Calcium dodecylbenzene sulfonate | 5.00 | 5.00 |
| 7 | n-Butanol | 10.00 | 10.00 |
| 8 | Aromatic hydrocarbons solvent C9 | 54.98 | 37.97 |
| | Total | 100.00 | 100.00 |

The ingredients were weighed and taken as per table 2. Solvent C9 and n-butanol were taken. Then, castor oil ethoxylate and calcium dodecylbenzene sulfonate were added and stirred well using a high shear mixer. To the mixture, Pinoxaden, Carfentrazone-ethyl, Fenoxaprop-p-ethyl and Mefenpyr diethyl were added one by one with stirring till a clear solution was obtained. The solution was then filtered through proper filtration apparatus to obtain the title herbicidal composition in ME form.

Example 6 to 10

TABLE 3

| Sr. No. | Ingredients | Eg: 6 % w/w | Eg: 7 % w/w | Eg: 8 % w/w | Eg: 9 % w/w | Eg: 10 % w/w |
|---|---|---|---|---|---|---|
| | Pinoxaden + Carfentrazone-ethyl + Isoproturon WP | | | | | |
| 1 | Pinoxaden Technical (100% Basis) | 1 | 2 | 4.5 | 10 | 12.5 |
| 2 | Carfentrazone-ethyl Technical (100% Basis) | 4 | 1 | 2 | 4.5 | 5 |
| 3 | Isoproturon Technical (100% Basis) | 60 | 60 | 50 | 60 | 40 |
| 4 | Dispersing agent (Sodium salt of naphthalene sulfonate condensate/ sulfonated aromatic polymer, sodiumsalt/ Sodium Polycarboxylate/Ethanesulfonic acid, 2-[methyl[(9Z)-1-oxo-9-octadecenyl]amino]-sodium salt/Sodium 2-(methyloleoylamino)ethane-1-sulphonate) | 10 | 10 | 10 | 10 | 8 |
| 5 | Wetting agent (sodium lauryl sulphate/ sodium alkyl naphthalene sulfonate blend/ sodium alkylnaphthalenesulfonate/Sodium Isopropyl Naphthalene Sulfonate/Sodium dioctylsulfosuccinate) | 5 | 5 | 5 | 5 | 4 |
| 6 | Defoamer (Dimethyl polysiloxane) | 0.4 | 0.4 | 0.2 | 0.4 | 0.3 |
| 7 | Filler (China clay/silica) | Q.S. to make 100% | Q.S. to make 100% | Q.S. to make 100% | Q.S. to make 100% | Q.S. to make 100% |
| | Total | 100 | 100 | 100 | 100 | 100 |

QS: quantity sufficient required to make 100% w/w formulation

Process of Preparing Synergistic Herbicidal Composition Comprising Pinoxaden, Carfentrazone-ethyl and Isoproturon WP Table 4 provides quantities of active ingredients and raw material charged to prepare the synergistic composition of the present invention in WP form. In table 4, active ingredients pinoxaden, carfentrazone-ethyl, isoproturon are in technical grade with 98%, 95% and 95% purity respectively. Particularly example 8 corresponds to column C in table 4.

TABLE 4

| Sr. No. | Ingredients | | C Quantity (g) | | |
|---|---|---|---|---|---|
| | Quantities of active ingredients and raw material charged | | | | |
| 1 | Pinoxaden Technical (98% Basis) | 4.60 | 4.60 | 4.60 | 4.60 |
| 2 | Carfentrazone-ethyl Technical (95% Basis) | 2.11 | 2.11 | 2.11 | 2.11 |
| 3 | Isoproturon Technical (95% Basis) | 52.64 | 52.64 | 52.64 | 52.64 |
| 4 | Sodium salt of naphthalene sulfonate condensate | 10.00 | 10.00 | — | — |
| 5 | Sodium polycarboxylate | — | — | 10.00 | 10.00 |
| 6 | Sodium alkyl naphthalene sulfonate blend | 5.00 | — | 5.00 | — |
| 7 | Sodium dioctylsulfosuccinate | — | 5.00 | — | 5.00 |
| 8 | Dimethyl polysiloxane | 0.20 | 0.20 | 0.20 | 0.20 |
| 9 | China clay | 25.45 | 25.45 | 25.45 | 25.45 |
| | Total | 100.00 | 100.00 | 100.00 | 100.00 |

The ingredients were weighed and taken as per table 4. Sodium salt of naphthalene sulfonate condensate/sodium polycarboxylate, sodium alkyl naphthalene sulfonate blend/ sodium dioctylsulfosuccinate, dimethyl polysiloxane, china clay were taken. Then, Pinoxaden, Carfentrazone-ethyl and Isoproturon were added and mixed well using proper ribbon blender type mixer.

The mixture was milled using air jet mill by keeping the suitable air pressure. Then, grinding was carried out until a mean particle size of below 10 microns was obtained. After grinding, mixture was mixed homogeneously in a blender to obtain the title herbicidal composition in WP form.

Bio-Efficacy of the Herbicidal Composition of the Present Invention

Two experimental trials to evaluate the herbicidal composition of the present invention were conducted at different trial sites in Karnal (Haryana) and Jalandhar (Punjab) against grassy and broad leaved weeds of wheat crop (variety WH 1105 in Karnal and PBW 803 in Jalandhar), which are prevalent in all wheat growing seasons with solo formulations, binary formulations and ternary formulations of the present invention as per the details provided in Table 5 to 13.

The experiment was laid out in Randomized Block Design (RBD). The plot size was 10 m×10 m and the spacing was 20 cm×10 cm. All the recommended agronomic practices were followed throughout the cropping period. The different formulations were weighed according to the doses and diluted in water and applied using high volume knapsack sprayer fitted with a pressure regulator and a vertical bar with one flat fan nozzle at 31/30 days after sowing (DAS) at the locations and evaluated for % WCE (weed control efficiency) at 15, 30, 45 and 60 days after herbicide application (DAHA). 400 L/ha of water was used to dilute recommended doses of the formulation in all trials.

Weeds were collected from one square meter of each experimental plot and were cleaned and separated species wise. Weeds in different species were oven dried and then weight was taken separately. Weed control efficiency for individual species was calculated using the below formula:

Weed control efficiency($WCE$ %) =

$$\frac{\text{Weed control in control plot} - \text{weed intreated plot}}{\text{Weed population in control plot}} \times 100$$

Plants from each experimental plot were harvested and grains were separated and weight of grains was taken. Thereafter weight was converted to yield into kg per hectare.

TABLE 5

| | | |
|---|---|---|
| Treatment Details | | |
| S. No. | Treat-ments No. | Treatment Details |
| 1 | $T_1$ | Pinoxaden 9% + Carfentrazone-ethyl 4% + Fenoxaprop-p-ethyl 20% ME |
| 2 | $T_2$ | Pinoxaden 4.5% + Carfentrazone-ethyl 2% + Fenoxaprop-p-ethyl 10% ME |

TABLE 5-continued

| | | |
|---|---|---|
| Treatment Details | | |
| S. No. | Treat-ments No. | Treatment Details |
| 3 | $T_3$ | Pinoxaden 4.5% + Carfentrazone-ethyl 2% + Isoproturon 50% WP |
| 4 | $T_4$ | Pinoxaden 5.1% EC |
| 5 | $T_5$ | Carfentrazone ethyl 40% DF |
| 6 | $T_6$ | Fenoxaprop-p-ethyl 10% EC |
| 7 | $T_7$ | Isoproturon 50% WP |
| 8 | $T_8$ | Pinoxaden 5.1% EC + Carfentrazone ethyl 40% DF |
| 9 | $T_9$ | Pinoxaden 5.1% EC + Fenoxaprop-p-Ethyl 10% EC |
| 10 | $T_{10}$ | Carfentrazone ethyl 40% DF + Fenoxaprop-p-Ethyl 10% EC |
| 11 | $T_{11}$ | Pinoxaden 5.1% EC + Isoproturon 50% WP |
| 12 | $T_{12}$ | Carfentrazone ethyl 40% DF + Isoproturon 50% WP |
| 13 | $T_{13}$ | Control |

TABLE 6

| | | | | | | | | | | | | | | |
|---|---|---|---|---|---|---|---|---|---|---|---|---|---|---|
| | | | | Effect of treatment (Pinoxaden + Carfentrazone-ethyl + Fenoxaprop-p-ethyl/Isoproturon) on WCE against *Phalaris minor* | | | | | | | | | | |
| S. No. | Treatments | Dose | | 15 DAHA | | | 30 DAHA | | | 45 DAHA | | | 60 DAHA | | |
| | | Formulation | a.i. | KL | JL | PL | KL | JL | PL | KL | JL | PL | KL | JL | PL |
| 1 | $T_1$ | 500 ml/ha | (45 + 20 + 100) g/ha | 97.56 | 97.05 | 97.31 | 97.52 | 96.45 | 96.99 | 98.54 | 97.51 | 98.03 | 99.46 | 98.51 | 98.99 |
| 2 | $T_2$ | 1000 ml/ha | (45 + 20 + 100) g/ha | 95.29 | 94.33 | 94.81 | 96.32 | 94.79 | 95.56 | 97.34 | 95.9 | 96.62 | 98.16 | 96.85 | 97.51 |
| 3 | $T_3$ | 1000 g/ha | (45 + 20 + 500) g/ha | 97.2 | 96.22 | 96.71 | 98.25 | 96.69 | 97.47 | 99.29 | 97.82 | 98.56 | 100.12 | 98.79 | 99.46 |
| 4 | $T_4$ | 900 ml/ha | 45 g/ha | 66.67 | 68.16 | 67.42 | 68.98 | 67.64 | 68.31 | 70.07 | 68.66 | 69.37 | 66.83 | 68.43 | 67.63 |
| 5 | $T_5$ | 50 g/ha | 20 g/ha | 38.82 | 39.18 | 39.00 | 39.81 | 38.53 | 39.17 | 41.08 | 39.82 | 40.45 | 30.31 | 39.66 | 34.99 |
| 6 | $T_6$ | 1000 ml/ha | 100 g/ha | 56.04 | 56.16 | 56.10 | 56.76 | 55.63 | 56.20 | 57.64 | 56.49 | 57.07 | 56.15 | 56.42 | 56.29 |
| 7 | $T_7$ | 1000 g/ha | 500 g/ha | 59.96 | 60.09 | 60.03 | 60.73 | 59.52 | 60.13 | 61.67 | 60.44 | 61.06 | 60.08 | 60.37 | 60.23 |
| 8 | $T_8$ | (900 ml + 50 g)/ha | (45 + 20) g/ha | 72.32 | 74.14 | 73.23 | 72.60 | 73.62 | 73.11 | 74.57 | 74.80 | 74.69 | 75.75 | 74.75 | 75.25 |
| 9 | $T_9$ | (900 ml + 1000 ml)/ha | (45 + 100) g/ha | 77.44 | 77.60 | 77.52 | 76.20 | 72.62 | 74.41 | 75.91 | 71.74 | 73.83 | 74.22 | 70.66 | 72.44 |
| 10 | $T_{10}$ | (50 g + 1000 ml)/ha | (20 + 100) g/ha | 61.47 | 63.02 | 62.25 | 61.71 | 62.57 | 62.14 | 63.38 | 63.58 | 63.48 | 64.39 | 63.53 | 63.96 |
| 11 | $T_{11}$ | (900 ml + 1000 g)/ha | (45 + 500) g/ha | 80.54 | 80.70 | 80.62 | 79.25 | 75.52 | 77.39 | 78.95 | 74.61 | 76.78 | 77.19 | 73.49 | 75.34 |
| 12 | $T_{12}$ | (50 g + 1000 g)/ha | (20 + 500) g/ha | 62.70 | 64.28 | 63.49 | 62.94 | 63.82 | 63.38 | 64.65 | 64.85 | 64.75 | 65.68 | 64.8 | 65.24 |
| 13 | $T_{13}$ | — | — | — | — | — | — | — | — | — | — | — | — | — | — |

KL: Karnal;
JL: Jalandhar;
PL: Pooled

TABLE 7

| | | | | | | | | | | | | | | |
|---|---|---|---|---|---|---|---|---|---|---|---|---|---|---|
| | | | | Effect of treatment (Pinoxaden + Carfentrazone-ethyl + Fenoxaprop-p-ethyl/Isoproturon) on WCE against *Avena ludoviciana* | | | | | | | | | | |
| S. No. | Treatments | Dose | | 15 DAHA | | | 30 DAHA | | | 45 DAHA | | | 60 DAHA | | |
| | | Formulation | a.i. | KL | JL | PL | KL | JL | PL | KL | JL | PL | KL | JL | PL |
| 1 | $T_1$ | 500 ml/ha | (45 + 20 + 100) g/ha | 96.72 | 97.00 | 96.86 | 97.54 | 97.43 | 97.49 | 99.85 | 99.29 | 99.57 | 99.95 | 97.94 | 98.95 |
| 2 | $T_2$ | 1000 ml/ha | (45 + 20 + 100) g/ha | 96.54 | 96.29 | 96.42 | 97.21 | 96.74 | 96.98 | 99.70 | 98.69 | 99.20 | 98.52 | 97.91 | 98.22 |
| 3 | $T_3$ | 1000 g/ha | (45 + 20 + 500) g/ha | 96.93 | 96.68 | 96.81 | 97.60 | 97.13 | 97.37 | 99.90 | 99.08 | 99.49 | 98.91 | 98.30 | 98.61 |
| 4 | $T_4$ | 900 ml/ha | 45 g/ha | 66.32 | 67.41 | 66.87 | 68.36 | 67.81 | 68.09 | 70.27 | 69.33 | 69.80 | 67.32 | 68.62 | 67.97 |
| 5 | $T_5$ | 50 g/ha | 20 g/ha | 38.31 | 38.27 | 38.29 | 38.64 | 38.77 | 38.71 | 41.35 | 40.76 | 41.06 | 30.99 | 39.92 | 35.46 |
| 6 | $T_6$ | 1000 ml/ha | 100 g/ha | 55.70 | 55.51 | 55.61 | 56.08 | 55.80 | 55.94 | 57.83 | 57.10 | 57.47 | 56.64 | 56.60 | 56.62 |

TABLE 7-continued

Effect of treatment (Pinoxaden + Carfentrazone-ethyl + Fenoxaprop-p-ethyl/Isoproturon) on WCE against *Avena ludoviciana*

| S. No. | Treatments | Dose Formulation | a.i. | 15 DAHA KL | JL | PL | 30 DAHA KL | JL | PL | 45 DAHA KL | JL | PL | 60 DAHA KL | JL | PL |
|---|---|---|---|---|---|---|---|---|---|---|---|---|---|---|---|
| 7 | T7 | 1000 g/ha | 500 g/ha | 61.27 | 61.06 | 61.17 | 61.69 | 61.38 | 61.54 | 63.61 | 62.81 | 63.21 | 62.30 | 62.26 | 62.28 |
| 8 | T8 | (900 ml + 50 g)/ha | (45 + 20) g/ha | 71.80 | 73.37 | 72.59 | 72.53 | 73.86 | 73.20 | 74.84 | 75.74 | 75.29 | 76.29 | 75.02 | 75.66 |
| 9 | T9 | (900 ml + 1000 ml)/ha | (45 + 100) g/ha | 77.06 | 76.95 | 77.01 | 75.51 | 72.82 | 74.17 | 76.17 | 72.69 | 74.43 | 74.58 | 70.93 | 72.76 |
| 10 | T10 | (50 g + 1000 ml)/ha | (20 + 100) g/ha | 61.03 | 62.36 | 61.70 | 61.65 | 62.78 | 62.22 | 63.61 | 64.38 | 64.00 | 64.84 | 63.77 | 64.31 |
| 11 | T11 | (900 ml + 1000 g)/ha | (45 + 500) g/ha | 80.14 | 80.03 | 80.09 | 78.53 | 75.73 | 77.13 | 79.22 | 75.60 | 77.41 | 77.56 | 73.77 | 75.67 |
| 12 | T12 | (50 g + 1000 g)/ha | (20 + 500) g/ha | 62.25 | 63.61 | 62.93 | 62.88 | 64.04 | 63.46 | 64.88 | 65.67 | 65.28 | 66.14 | 65.05 | 65.60 |
| 13 | T13 | — | — | — | — | — | — | — | — | — | — | — | — | — | — |

KL: Karnal;
JL: Jalandhar;
PL: Pooled

TABLE 8

Effect of treatment (Pinoxaden + Carfentrazone-ethyl + Fenoxaprop-p-ethyl/Isoproturon) on WCE against *Chenopodium album*

| S. No. | Treatments | Dose Formulation | a.i. | 15 DAHA KL | JL | PL | 30 DAHA KL | JL | PL | 45 DAHA KL | JL | PL | 60 DAHA KL | JL | PL |
|---|---|---|---|---|---|---|---|---|---|---|---|---|---|---|---|
| 1 | T1 | 500 ml/ha | (45 + 20 + 100) g/ha | 92.67 | 94.08 | 93.38 | 94.89 | 95.10 | 95.00 | 95.26 | 96.02 | 95.64 | 91.44 | 92.39 | 91.92 |
| 2 | T2 | 1000 ml/ha | (45 + 20 + 100) g/ha | 90.82 | 92.93 | 91.88 | 92.99 | 93.95 | 93.47 | 93.36 | 94.80 | 94.08 | 89.60 | 91.23 | 90.42 |
| 3 | T3 | 1000 g/ha | (45 + 20 + 500) g/ha | 93.00 | 95.16 | 94.08 | 95.22 | 96.20 | 95.71 | 95.60 | 97.08 | 96.34 | 91.75 | 93.42 | 92.59 |
| 4 | T4 | 900 ml/ha | 45 g/ha | 32.08 | 33.04 | 32.56 | 33.96 | 34.01 | 33.99 | 34.28 | 34.73 | 34.51 | 32.64 | 33.15 | 32.90 |
| 5 | T5 | 50 g/ha | 20 g/ha | 68.20 | 69.39 | 68.80 | 70.23 | 70.43 | 70.33 | 70.59 | 71.19 | 70.89 | 67.69 | 68.43 | 68.06 |
| 6 | T6 | 1000 ml/ha | 100 g/ha | 22.20 | 22.60 | 22.40 | 22.74 | 23.00 | 22.87 | 22.83 | 23.11 | 22.97 | 21.91 | 22.24 | 22.08 |
| 7 | T7 | 1000 g/ha | 500 g/ha | 25.75 | 26.22 | 25.99 | 26.38 | 26.68 | 26.53 | 26.48 | 26.81 | 26.65 | 25.42 | 25.80 | 25.61 |
| 8 | T8 | (900 ml + 50 g)/ha | (45 + 20) g/ha | 66.22 | 68.83 | 67.53 | 68.31 | 69.86 | 69.09 | 68.67 | 70.33 | 69.50 | 65.76 | 67.57 | 66.67 |
| 9 | T9 | (900 ml + 1000 ml)/ha | (45 + 100) g/ha | 35.28 | 35.76 | 35.52 | 34.59 | 34.98 | 34.79 | 33.38 | 33.12 | 33.25 | 33.14 | 31.83 | 32.49 |
| 10 | T10 | (50 g + 1000 ml)/ha | (20 + 100) g/ha | 49.67 | 51.62 | 50.65 | 51.23 | 52.40 | 51.82 | 51.50 | 52.75 | 52.13 | 49.32 | 50.67 | 50.00 |
| 11 | T11 | (900 ml + 1000 g)/ha | (45 + 500) g/ha | 38.81 | 39.34 | 39.08 | 38.05 | 38.48 | 38.27 | 36.72 | 36.43 | 36.58 | 36.45 | 35.01 | 35.73 |
| 12 | T12 | (50 g + 1000 g)/ha | (20 + 500) g/ha | 54.64 | 56.78 | 55.71 | 56.35 | 57.64 | 57.00 | 56.65 | 58.03 | 57.34 | 54.25 | 55.74 | 55.00 |
| 13 | T13 | — | — | — | — | — | — | — | — | — | — | — | — | — | — |

KL: Karnal;
JL: Jalandhar;
PL: Pooled

TABLE 9

Effect of treatment (Pinoxaden + Carfentrazone-ethyl + Fenoxaprop-p-ethyl/Isoproturon) on WCE against *Melilotus* sp.

| S. No. | Treatments | Dose Formulation | a.i. | 15 DAHA KL | JL | PL | 30 DAHA KL | JL | PL | 45 DAHA KL | JL | PL | 60 DAHA KL | JL | PL |
|---|---|---|---|---|---|---|---|---|---|---|---|---|---|---|---|
| 1 | T1 | 500 ml/ha | (45 + 20 + 100) g/ha | 87.93 | 84.81 | 86.37 | 89.24 | 86.42 | 87.83 | 90.17 | 90.38 | 90.28 | 88.29 | 87.27 | 87.78 |
| 2 | T2 | 1000 ml/ha | (45 + 20 + 100) g/ha | 85.65 | 82.50 | 84.08 | 87.26 | 84.00 | 85.63 | 88.11 | 87.90 | 88.01 | 86.22 | 84.40 | 85.31 |
| 3 | T3 | 1000 g/ha | (45 + 20 + 500) g/ha | 88.22 | 84.98 | 86.60 | 89.88 | 86.52 | 88.20 | 90.75 | 90.54 | 90.65 | 88.81 | 86.93 | 87.87 |
| 4 | T4 | 900 ml/ha | 45 g/ha | 30.19 | 32.12 | 31.16 | 26.27 | 32.58 | 29.43 | 27.23 | 34.28 | 30.76 | 25.45 | 32.92 | 29.19 |
| 5 | T5 | 50 g/ha | 20 g/ha | 55.29 | 63.23 | 59.26 | 63.93 | 64.12 | 64.03 | 64.81 | 67.13 | 65.97 | 63.09 | 64.80 | 63.95 |

TABLE 9-continued

Effect of treatment (Pinoxaden + Carfentrazone-ethyl + Fenoxaprop-p-ethyl/Isoproturon) on WCE against *Melilotus* sp.

| S. No. | Treatments | Dose Formulation | a.i. | 15 DAHA | | | 30 DAHA | | | 45 DAHA | | | 60 DAHA | | |
|---|---|---|---|---|---|---|---|---|---|---|---|---|---|---|---|
| | | | | KL | JL | PL | KL | JL | PL | KL | JL | PL | KL | JL | PL |
| 6 | T$_6$ | 1000 ml/ha | 100 g/ha | 20.18 | 20.40 | 20.29 | 20.88 | 20.66 | 20.77 | 21.72 | 21.62 | 21.67 | 21.27 | 20.85 | 21.06 |
| 7 | T$_7$ | 1000 g/ha | 500 g/ha | 23.41 | 23.66 | 23.54 | 24.22 | 23.97 | 24.10 | 25.20 | 25.08 | 25.14 | 24.67 | 24.19 | 24.43 |
| 8 | T$_8$ | (900 ml + 50 g)/ha | (45 + 20) g/ha | 61.72 | 62.89 | 62.31 | 64.52 | 63.71 | 64.12 | 65.34 | 66.72 | 66.03 | 63.65 | 64.35 | 64.00 |
| 9 | T$_9$ | (900 ml + 1000 ml)/ha | (45 + 100) g/ha | 35.38 | 29.77 | 32.58 | 34.15 | 30.16 | 32.16 | 31.87 | 31.57 | 31.72 | 31.17 | 30.42 | 30.80 |
| 10 | T$_{10}$ | (50 g + 1000 ml)/ha | (20 + 100) g/ha | 46.29 | 47.17 | 46.73 | 48.39 | 47.78 | 48.09 | 49.00 | 50.04 | 49.52 | 47.74 | 48.26 | 48.00 |
| 11 | T$_{11}$ | (900 ml + 1000 g)/ha | (45 + 500) g/ha | 38.92 | 32.75 | 35.84 | 37.57 | 33.18 | 35.38 | 35.06 | 34.73 | 34.90 | 34.29 | 33.46 | 33.88 |
| 12 | T$_{12}$ | (50 g + 1000 g)/ha | (20 + 500) g/ha | 50.92 | 51.89 | 51.41 | 53.23 | 52.56 | 52.90 | 53.90 | 55.04 | 54.47 | 52.51 | 53.09 | 52.80 |
| 13 | T$_{13}$ | — | — | — | — | — | — | — | — | — | — | — | — | — | — |

KL: Karnal;
JL: Jalandhar;
PL: Pooled

TABLE 10

Effect of treatment (Pinoxaden + Carfentrazone-ethyl + Fenoxaprop-p-ethyl/Isoproturon) on WCE against *Medicago deniculate*

| S. No. | Treatments | Dose Formulation | a.i. | 15 DAHA | | | 30 DAHA | | | 45 DAHA | | | 60 DAHA | | |
|---|---|---|---|---|---|---|---|---|---|---|---|---|---|---|---|
| | | | | KL | JL | PL | KL | JL | PL | KL | JL | PL | KL | JL | PL |
| 1 | T$_1$ | 500 ml/ha | (45 + 20 + 100) g/ha | 86.79 | 87.15 | 86.97 | 87.66 | 89.85 | 88.76 | 86.50 | 87.76 | 87.13 | 85.61 | 90.19 | 87.90 |
| 2 | T$_2$ | 1000 ml/ha | (45 + 20 + 100) g/ha | 83.86 | 86.20 | 85.03 | 82.82 | 88.74 | 85.78 | 83.35 | 84.80 | 84.08 | 80.85 | 89.09 | 84.97 |
| 3 | T$_3$ | 1000 g/ha | (45 + 20 + 500) g/ha | 85.54 | 87.92 | 86.73 | 84.48 | 90.51 | 87.50 | 85.02 | 86.50 | 85.76 | 82.47 | 90.87 | 86.67 |
| 4 | T$_4$ | 900 ml/ha | 45 g/ha | 29.67 | 29.48 | 29.58 | 30.54 | 31.41 | 30.98 | 15.56 | 19.15 | 17.36 | 30.32 | 31.71 | 31.02 |
| 5 | T$_5$ | 50 g/ha | 20 g/ha | 62.98 | 64.02 | 63.50 | 63.96 | 66.22 | 65.09 | 57.04 | 55.33 | 56.19 | 63.21 | 66.59 | 64.90 |
| 6 | T$_6$ | 1000 ml/ha | 100 g/ha | 20.47 | 20.92 | 20.70 | 20.68 | 21.58 | 21.13 | 20.33 | 20.62 | 20.48 | 20.36 | 21.67 | 21.02 |
| 7 | T$_7$ | 1000 g/ha | 500 g/ha | 23.75 | 24.27 | 24.01 | 23.99 | 25.03 | 24.51 | 23.58 | 23.92 | 23.75 | 23.62 | 25.14 | 24.38 |
| 8 | T$_8$ | (900 ml + 50 g)/ha | (45 + 20) g/ha | 61.05 | 63.38 | 62.22 | 61.85 | 65.68 | 63.77 | 61.74 | 59.10 | 60.42 | 60.90 | 66.03 | 63.47 |
| 9 | T$_9$ | (900 ml + 1000 ml)/ha | (45 + 100) g/ha | 31.46 | 32.46 | 31.96 | 30.74 | 32.88 | 31.81 | 34.10 | 33.57 | 33.84 | 29.02 | 31.86 | 30.44 |
| 10 | T$_{10}$ | (50 g + 1000 ml)/ha | (20 + 100) g/ha | 45.79 | 47.54 | 46.67 | 46.39 | 49.26 | 47.83 | 46.30 | 44.33 | 45.32 | 45.68 | 49.52 | 47.60 |
| 11 | T$_{11}$ | (900 ml + 1000 g)/ha | (45 + 500) g/ha | 34.61 | 35.71 | 35.16 | 33.81 | 36.17 | 34.99 | 37.51 | 36.93 | 37.22 | 31.92 | 35.05 | 33.49 |
| 12 | T$_{12}$ | (50 g + 1000 g)/ha | (20 + 500) g/ha | 50.37 | 52.29 | 51.33 | 51.03 | 54.19 | 52.61 | 50.93 | 48.76 | 49.85 | 50.25 | 54.47 | 52.36 |
| 13 | T$_{13}$ | — | — | — | — | — | — | — | — | — | — | — | — | — | — |

KL: Karnal;
JL: Jalandhar;
PL: Pooled

TABLE 11

Effect of treatment (Pinoxaden + Carfentrazone-ethyl + Fenoxaprop-p-ethyl/Isoproturon) on WCE against against *Anagalis arvensis*

| S. No. | Treatments | Dose Formulation | a.i. | 15 DAHA | | | 30 DAHA | | | 45 DAHA | | | 60 DAHA | | |
|---|---|---|---|---|---|---|---|---|---|---|---|---|---|---|---|
| | | | | KL | JL | PL | KL | JL | PL | KL | JL | PL | KL | JL | PL |
| 1 | T$_1$ | 500 ml/ha | (45 + 20 + 100) g/ha | 84.74 | 88.64 | 86.69 | 84.74 | 90.33 | 87.54 | 87.84 | 91.03 | 89.44 | 86.16 | 87.04 | 86.60 |
| 2 | T$_2$ | 1000 ml/ha | (45 + 20 + 100) g/ha | 83.05 | 86.11 | 84.58 | 83.24 | 87.95 | 85.60 | 86.25 | 88.73 | 87.49 | 84.60 | 84.80 | 84.70 |
| 3 | T$_3$ | 1000 g/ha | (45 + 20 + 500) g/ha | 88.03 | 91.28 | 89.66 | 88.23 | 93.23 | 90.73 | 91.43 | 94.05 | 92.74 | 89.68 | 89.89 | 89.79 |

TABLE 11-continued

Effect of treatment (Pinoxaden + Carfentrazone-ethyl + Fenoxaprop-
p-ethyl/Isoproturon) on WCE against against *Anagalis arvensis*

| S. | | Dose | | 15 DAHA | | | 30 DAHA | | | 45 DAHA | | | 60 DAHA | | |
|---|---|---|---|---|---|---|---|---|---|---|---|---|---|---|---|
| No. | Treatments | Formulation | a.i. | KL | JL | PL | KL | JL | PL | KL | JL | PL | KL | JL | PL |
| 4 | $T_4$ | 900 ml/ha | 45 g/ha | 26.85 | 28.70 | 27.78 | 26.85 | 29.84 | 28.35 | 28.82 | 30.32 | 29.57 | 27.76 | 28.75 | 28.26 |
| 5 | $T_5$ | 50 g/ha | 20 g/ha | 59.88 | 62.96 | 61.42 | 59.88 | 64.41 | 62.15 | 62.56 | 65.03 | 63.80 | 61.16 | 62.10 | 61.63 |
| 6 | $T_6$ | 1000 ml/ha | 100 g/ha | 11.28 | 11.83 | 11.56 | 11.28 | 12.06 | 11.67 | 11.69 | 12.14 | 11.92 | 11.46 | 11.60 | 11.53 |
| 7 | $T_7$ | 1000 g/ha | 500 g/ha | 13.08 | 13.72 | 13.40 | 13.08 | 13.99 | 13.54 | 13.56 | 14.08 | 13.82 | 13.29 | 13.46 | 13.38 |
| 8 | $T_8$ | (900 ml + 50 g)/ha | (45 + 20) g/ha | 57.29 | 61.66 | 59.48 | 57.29 | 63.11 | 60.20 | 59.97 | 63.72 | 61.85 | 58.50 | 60.83 | 59.67 |
| 9 | $T_9$ | (900 ml + 1000 ml)/ha | (45 + 100) g/ha | 25.20 | 25.90 | 25.55 | 24.61 | 25.32 | 24.97 | 24.44 | 24.10 | 24.27 | 23.70 | 22.96 | 23.33 |
| 10 | $T_{10}$ | (50 g + 1000 ml)/ha | (20 + 100) g/ha | 40.10 | 43.16 | 41.63 | 40.10 | 44.17 | 42.14 | 41.98 | 44.61 | 43.30 | 40.95 | 42.58 | 41.77 |
| 11 | $T_{11}$ | (900 ml + 1000 g)/ha | (45 + 500) g/ha | 27.72 | 28.49 | 28.11 | 27.07 | 27.85 | 27.46 | 26.88 | 26.51 | 26.70 | 26.07 | 25.26 | 25.67 |
| 12 | $T_{12}$ | (50 g + 1000 g)/ha | (20 + 500) g/ha | 44.11 | 47.48 | 45.80 | 44.11 | 48.59 | 46.35 | 46.18 | 49.07 | 47.63 | 45.05 | 46.84 | 45.95 |
| 13 | $T_{13}$ | — | — | — | — | — | — | — | — | — | — | — | — | — | — |

KL: Karnal;
JL: Jalandhar;
PL: Pooled

TABLE 12

Effect of treatment (Pinoxaden + Carfentrazone-ethyl + Fenoxaprop-p-ethyl/Isoproturon) on WCE against *Rumex* sp.

| S. | | Dose | | 15 DAHA | | | 30 DAHA | | | 45 DAHA | | | 60 DAHA | | |
|---|---|---|---|---|---|---|---|---|---|---|---|---|---|---|---|
| No. | Treatments | Formulation | a.i. | KL | JL | PL | KL | JL | PL | KL | JL | PL | KL | JL | PL |
| 1 | $T_1$ | 500 ml/ha | (45 + 20 + 100) g/ha | 88.79 | 92.06 | 90.43 | 88.98 | 94.02 | 91.50 | 92.21 | 94.85 | 93.53 | 90.44 | 90.66 | 90.55 |
| 2 | $T_2$ | 1000 ml/ha | (45 + 20 + 100) g/ha | 86.48 | 90.53 | 88.51 | 86.48 | 90.48 | 88.48 | 89.54 | 90.73 | 90.14 | 87.50 | 86.45 | 86.98 |
| 3 | $T_3$ | 1000 g/ha | (45 + 20 + 500) g/ha | 91.67 | 95.96 | 93.82 | 91.67 | 95.91 | 93.79 | 94.91 | 96.17 | 95.54 | 92.75 | 91.64 | 92.20 |
| 4 | $T_4$ | 900 ml/ha | 45 g/ha | 26.85 | 28.70 | 27.78 | 26.85 | 29.84 | 28.35 | 28.82 | 30.32 | 29.57 | 27.76 | 28.75 | 28.26 |
| 5 | $T_5$ | 50 g/ha | 20 g/ha | 59.88 | 62.96 | 61.42 | 59.88 | 64.41 | 62.15 | 62.56 | 65.03 | 63.80 | 61.16 | 62.10 | 61.63 |
| 6 | $T_6$ | 1000 ml/ha | 100 g/ha | 11.28 | 11.83 | 11.56 | 11.28 | 12.06 | 11.67 | 11.69 | 12.14 | 11.92 | 11.46 | 11.60 | 11.53 |
| 7 | $T_7$ | 1000 g/ha | 500 g/ha | 13.08 | 13.72 | 13.40 | 13.08 | 13.99 | 13.54 | 13.56 | 14.08 | 13.82 | 13.29 | 13.46 | 13.38 |
| 8 | $T_8$ | (900 ml + 50 g)/ha | (45 + 20) g/ha | 57.29 | 61.66 | 59.48 | 57.29 | 63.11 | 60.20 | 59.97 | 63.72 | 61.85 | 58.50 | 60.83 | 59.67 |
| 9 | $T_9$ | (900 ml + 1000 ml)/ha | (45 + 100) g/ha | 25.20 | 25.90 | 25.55 | 24.61 | 25.32 | 24.97 | 24.44 | 24.10 | 24.27 | 23.70 | 22.96 | 23.33 |
| 10 | $T_{10}$ | (50 g + 1000 ml)/ha | (20 + 100) g/ha | 40.10 | 43.16 | 41.63 | 40.10 | 44.17 | 42.14 | 41.98 | 44.61 | 43.30 | 40.95 | 42.58 | 41.77 |
| 11 | $T_{11}$ | (900 ml + 1000 g)/ha | (45 + 500) g/ha | 27.72 | 28.49 | 28.11 | 27.07 | 27.85 | 27.46 | 26.88 | 26.51 | 26.70 | 26.07 | 25.26 | 25.67 |
| 12 | $T_{12}$ | (50 g + 1000 g)/ha | (20 + 500) g/ha | 44.11 | 47.48 | 45.80 | 44.11 | 48.59 | 46.35 | 46.18 | 49.07 | 47.63 | 45.05 | 46.84 | 45.95 |
| 13 | $T_{13}$ | — | — | — | — | — | — | — | — | — | — | — | — | — | — |

KL: Karnal;
JL: Jalandhar;
PL: Pooled

TABLE 13

Effect of treatments (Pinoxaden + Carfentrazone-ethyl + Fenoxaprop-
p-ethyl/Isoproturon) on grain yield of wheat crop at harvest

| S. | | Dose | | Grain yield (kg/ha) | | | % increase against control |
|---|---|---|---|---|---|---|---|
| No. | Treatments | Formulation | a.i. | Karnal | Jalandhar | Mean | |
| 1 | $T_1$ | 500 ml/ha | (45 + 20 + 100) g/ha | 5934 | 6130 | 6032 | 95.02 |

TABLE 13-continued

Effect of treatments (Pinoxaden + Carfentrazone-ethyl + Fenoxaprop-p-ethyl/Isoproturon) on grain yield of wheat crop at harvest

| S. No. | Treatments | Dose Formulation | Dose a.i. | Grain yield (kg/ha) Karnal | Grain yield (kg/ha) Jalandhar | Grain yield (kg/ha) Mean | % increase against control |
|---|---|---|---|---|---|---|---|
| 2 | T₂ | 1000 ml/ha | (45 + 20 + 100) g/ha | 5865 | 6061 | 5963 | 92.79 |
| 3 | T₃ | 1000 g/ha | (45 + 20 + 500) g/ha | 6002 | 6180 | 6091 | 96.93 |
| 4 | T₄ | 900 ml/ha | 45 g/ha | 4887 | 5069 | 4978 | 60.94 |
| 5 | T₅ | 50 g/ha | 20 g/ha | 4599 | 4787 | 4693 | 51.73 |
| 6 | T₆ | 1000 ml/ha | 100 g/ha | 4008 | 4102 | 4055 | 31.10 |
| 7 | T₇ | 1000 g/ha | 500 g/ha | 4086 | 4170 | 4128 | 33.46 |
| 8 | T₈ | (900 ml + 50 g)/ha | (45 + 20) g/ha | 5308 | 5494 | 5401 | 74.62 |
| 9 | T₉ | (900 ml + 1000 ml)/ha | (45 + 100) g/ha | 5015 | 5177 | 5096 | 64.76 |
| 10 | T₁₀ | (50 g + 1000 ml)/ha | (20 + 100) g/ha | 5088 | 5204 | 5146 | 66.38 |
| 11 | T₁₁ | (900 ml + 1000 g)/ha | (45 + 500) g/ha | 5056 | 5218 | 5137 | 66.08 |
| 12 | T₁₂ | (50 g + 1000 g)/ha | (20 + 500) g/ha | 5129 | 5247 | 5188 | 67.73 |
| 13 | T₁₃ | — | — | 3056 | 3130 | 3093 | — |
| | | SEM | | 198 | 214 | 206 | — |
| | | CD5% | | 583 | 631 | 607 | — |

SEM—Standard error of mean;
CD5%: Critical Difference

Evaluation of Synergistic Effect

A synergistic effect exists whenever the action of an active ingredient combination is greater than the sum of the actions of the individual components. Synergism was calculated by using Colby's method, *Weeds*, vol. 15 No. 1(January 1967), pp. 20-2.

The synergistic action expected for a given combination of three active components can be calculated as follows:

$$E = (X + Y + Z) - \frac{(XY + YZ + XZ)}{100} + \frac{XYZ}{10000}$$

Where:

E represents expected percentage of control for the combination of the three active ingredients at defined doses (for example equal to x, y and z respectively), X is the percentage of control observed by the compound (I) at a defined dose (equal to x), Y is the percentage of control observed by the compound (II) at a defined dose (equal to y), Z is the percentage of control observed by the compound (III) at a defined dose (equal to z).

If observed control of the combination>Expected control, the combination is synergistic If observed control of the combination<Expected control, the combination is antagonistic If observed control of the combination=Expected control, the combination is additive

TABLE 14

Synergistic effect of Pinoxaden + Carfentrazone-ethyl + Fenoxaprop-p-ethyl/Isoproturon composition against *Phalaris minor* and *Avena ludoviciana*

| S. No. | Treatment | Dose/ha | Dose (a.i./ha) | Observed WCE(%) at 60 DAHA against *Phalaris minor* Pooled | Expected WCE(%) (using Colby's formula) | Observed WCE(%) at 60 DAHA against *Avena ludoviciana* Pooled | Expected WCE(%) (using Colby's formula) |
|---|---|---|---|---|---|---|---|
| 1 | T₁- Pinoxaden 9% + Carfentrazone-ethyl 4% + Fenoxaprop-p-ethyl 20% ME | 500 ml/ha | (45 + 20 + 100) g/ha | 98.99 | 90.80 | 98.95 | 91.03 |
| 2 | T₂- Pinoxaden 4.5% + Carfentrazone-ethyl 2% + Fenoxaprop-p-ethyl 10% ME | 1000 ml/ha | (45 + 20 + 100) g/ha | 97.51 | 90.80 | 98.22 | 91.03 |

TABLE 14-continued

Synergistic effect of Pinoxaden + Carfentrazone-ethyl + Fenoxaprop-
p-ethyl/Isoproturon composition against *Phalaris minor* and *Avena ludoviciana*

| S. No. | Treatment | Dose/ha | Dose (a.i./ha) | Observed WCE(%) at 60 DAHA against *Phalaris minor* Pooled | Expected WCE(%) (using Colby's formula) | Observed WCE(%) at 60 DAHA against *Avena ludoviciana* Pooled | Expected WCE(%) (using Colby's formula) |
|---|---|---|---|---|---|---|---|
| 3 | T$_3$- Pinoxaden 4.5% + Carfentrazone-ethyl 2% + Isoproturon 50% WP | 1000 g/ha | (45 + 20 + 500) g/ha | 99.46 | 91.63 | 98.61 | 92.20 |
| 4 | T$_4$- Pinoxaden 5.1% EC | 900 ml/ha | 45 g/ha | 67.63 | | 67.97 | |
| 5 | T$_5$- Carfentrazone ethyl 40% DF | 50 g/ha | 20 g/ha | 34.99 | | 35.46 | |
| 6 | T$_6$- Fenoxaprop-p-ethyl 10% EC | 1000 ml/ha | 100 g/ha | 56.29 | | 56.62 | |
| 7 | T$_7$- Isoproturon 50% WP | 1000 g/ha | 500 g/ha | 60.23 | | 62.28 | |

TABLE 15

Synergistic effect of Pinoxaden + Carfentrazone-ethyl + Fenoxaprop-
p-ethyl/Isoproturon composition against *Chenopodium album* and *Melilotus* sp.

| S. No. | Treatment | Dose/ha | Dose (a.i./ha) | Observed WCE(%) at 60 DAHA against *Chenopodium album* Pooled | Expected WCE(%) expected (using Colby's formula) | Observed WCE(%) at 60 DAHA against *Melilotus* sp. Pooled | Expected WCE(%) expected (using Colby's formula) |
|---|---|---|---|---|---|---|---|
| 1 | T$_1$- Pinoxaden 9% + Carfentrazone-ethyl 4% + Fenoxaprop-p-ethyl 20% ME | 500 ml/ha | (45 + 20 + 100) g/ha | 91.92 | 83.30 | 87.78 | 79.85 |
| 2 | T$_2$- Pinoxaden 4.5% + Carfentrazone-ethyl 2% + Fenoxaprop-p-ethyl 10% ME | 1000 ml/ha | (45 + 20 + 100) g/ha | 90.42 | 83.30 | 85.31 | 79.85 |
| 3 | T$_3$- Pinoxaden 4.5% + Carfentrazone-ethyl 2% + Isoproturon 50% WP | 1000 g/ha | (45 + 20 + 500) g/ha | 92.59 | 84.06 | 87.87 | 80.71 |
| 4 | T$_4$- Pinoxaden 5.1% EC | 900 ml/ha | 45 g/ha | 32.9 | | 29.19 | |
| 5 | T$_5$- Carfentrazone ethyl 40% DF | 50 g/ha | 20 g/ha | 68.06 | | 63.95 | |
| 6 | T$_6$- Fenoxaprop-p-ethyl 10% EC | 1000 ml/ha | 100 g/ha | 22.08 | | 21.06 | |
| 7 | T$_7$- Isoproturon 50% WP | 1000 g/ha | 500 g/ha | 25.61 | | 24.43 | |

23

24

TABLE 16

Synergistic effect of Pinoxaden + Carfentrazone-ethyl + Fenoxaprop-
p-ethyl ME composition against *Medicago deniculate* and *Anagalis arvensis*

| S. No. | Particular | Dose/ha | Dose (a.i./ha) | Observed WCE(%) at 60 DAHA against *Medicago deniculate* Pooled | Expected WCE(%) (using Colby's formula) | Observed WCE(%) at 60 DAHA against *Anagalis arvensis* Pooled | Expected WCE (%) (using Colby's formula) |
|---|---|---|---|---|---|---|---|
| 1 | T₁- Pinoxaden 9% + Carfentrazone-ethyl 4% + Fenoxaprop-p-ethyl 20% ME | 500 ml/ha | (45 + 20 + 100) g/ha | 87.90 | 80.88 | 86.60 | 75.65 |
| 2 | T₂- Pinoxaden 4.5% + Carfentrazone-ethyl 2% + Fenoxaprop-p-ethyl 10% ME | 1000 ml/ha | (45 + 20 + 100) g/ha | 84.97 | 80.88 | 84.70 | 75.65 |
| 3 | T₃- Pinoxaden 4.5% + Carfentrazone-ethyl 2% + Isoproturon 50% WP | 1000 g/ha | (45 + 20 + 500) g/ha | 86.67 | 81.69 | 89.79 | 76.16 |
| 4 | T₄- Pinoxaden 5.1% EC | 900 ml/ha | 45 g/ha | 31.02 | | 28.26 | |
| 5 | T₅- Carfentrazone ethyl 40% DF | 50 g/ha | 20 g/ha | 64.9 | | 61.63 | |
| 6 | T₆- Fenoxaprop-p-ethyl 10% EC | 1000 ml/ha | 100 g/ha | 21.02 | | 11.53 | |
| 7 | T₇- Isoproturon 50% WP | 1000 g/ha | 500 g/ha | 24.38 | | 13.38 | |

TABLE 17

Synergistic effect of Pinoxaden + Carfentrazone-ethyl +
Fenoxaprop-p-ethyl ME composition against *Rumex* sp.

| S. No. | Treatment | Dose/ha | Dose (a.i./ha) | Observed WCE(%) at 60 DAHA against *Rumex* sp. Pooled | Expected WCE(%) (using Colby's formula) |
|---|---|---|---|---|---|
| 1 | T₁- Pinoxaden 9% + Carfentrazone-ethyl 4% + Fenoxaprop-p-ethyl 20% ME | 500 ml/ha | (45 + 20 + 100) g/ha | 90.55 | 75.65 |
| 2 | T₂- Pinoxaden 4.5% + Carfentrazone-ethyl 2% + Fenoxaprop-p-ethyl 10% ME | 1000 ml/ha | (45 + 20 + 100) g/ha | 86.98 | 75.65 |
| 3 | T₃- Pinoxaden 4.5% + Carfentrazone-ethyl 2% + Isoproturon 50% WP | 1000 g/ha | (45 + 20 + 500) g/ha | 92.2 | 76.16 |
| 4 | T₄- Pinoxaden 5.1% EC | 900 ml/ha | 45 g/ha | 28.26 | |
| 5 | T₅- Carfentrazone ethyl 40% DF | 50 g/ha | 20 g/ha | 61.63 | |
| 6 | T₆- Fenoxaprop-p-ethyl 10% EC | 1000 ml/ha | 100 g/ha | 11.53 | |
| 7 | T₇- Isoproturon 50% WP | 1000 g/ha | 500 g/ha | 13.38 | |

It is evident from the above tables that the herbicidal composition of the present invention gave good control of weeds and higher yield as compared to the reference products (solo or binary composition). Further, the composition of present invention is synergistic.

Phytotoxicity Observations

For phytotoxicity evaluation on wheat crop, following observations were made by observing temporary or long lasting damage to the leaves if any viz., leaf injury on tips and leaf surface, wilting, vein clearing, necrosis, epinasty and hyponasty at 15, 30, 45, 60 DAHA.

been deleted herein for the sake of conciseness and readability but are properly within the scope of the following claims.

We claim:

1. A synergistic herbicidal composition comprising:
   a. pinoxaden;
   b. carfentrazone-ethyl;
   c. at least one herbicide compound selected from fenoxaprop-p-ethyl or isoproturon; and
   d. one or more excipients.

TABLE 19

Phytotoxic effect of the synergistic composition of the present invention on wheat crop

| S. No. | Treatments | Dose/ha | Epinasty KL | JL | Hyponasty KL | JL | Necrosis KL | JL | Vein clearing KL | JL | Wilting KL | JL |
|---|---|---|---|---|---|---|---|---|---|---|---|---|
| 1 | T₁- Pinoxaden 9% + Carfentrazone-ethyl 4% + Fenoxaprop-p-ethyl 20% ME | 500 ml | 0 | 0 | 0 | 0 | 0 | 0 | 0 | 0 | 0 | 0 |
| 2 | T₂- Pinoxaden 9% + Carfentrazone-ethyl 4% + Fenoxaprop-p-ethyl 20% ME | 750 ml/ha | 0 | 0 | 0 | 0 | 0 | 0 | 0 | 0 | 0 | 0 |
| 3 | T₃- Pinoxaden 9% + Carfentrazone-ethyl 4% + Fenoxaprop-p-ethyl 20% ME | 1000 ml/ha | 0 | 0 | 0 | 0 | 0 | 0 | 0 | 0 | 0 | 0 |
| 4 | T₄- Pinoxaden 4.5% + Carfentrazone-ethyl 2% + Fenoxaprop-p-ethyl 10% ME | 1000 ml | 0 | 0 | 0 | 0 | 0 | 0 | 0 | 0 | 0 | 0 |
| 5 | T₅- Pinoxaden 4.5% + Carfentrazone-ethyl 2% + Fenoxaprop-p-ethyl 10% ME | 1500 ml | 0 | 0 | 0 | 0 | 0 | 0 | 0 | 0 | 0 | 0 |
| 6 | T₆- Pinoxaden 4.5% + Carfentrazone-ethyl 2% + Fenoxaprop-p-ethyl 10% ME | 2000 ml | 0 | 0 | 0 | 0 | 0 | 0 | 0 | 0 | 0 | 0 |
| 7 | T₇- Pinoxaden 4.5% + Carfentrazone-ethyl 2% + Isoproturon 50% WP | 1000 g | 0 | 0 | 0 | 0 | 0 | 0 | 0 | 0 | 0 | 0 |
| 8 | T₈- Pinoxaden 4.5% + Carfentrazone-ethyl 2% + Isoproturon 50% WP | 1500 g | 0 | 0 | 0 | 0 | 0 | 0 | 0 | 0 | 0 | 0 |
| 9 | T₉- Pinoxaden 4.5% + Carfentrazone-ethyl 2% + Isoproturon 50% WP | 2000 g | 0 | 0 | 0 | 0 | 0 | 0 | 0 | 0 | 0 | 0 |
| 10 | T₁₀- Control | — | 0 | 0 | 0 | 0 | 0 | 0 | 0 | 0 | 0 | 0 |

KL: Karnal;
JL: Jalandhar;
0—No Phyto-toxicity;
10—Complete kill the plant

From the foregoing it will be observed that numerous modifications and variations can be effectuated without departing from the true spirit and scope of the novel concepts of the present invention. It is to be understood that no limitations with respect to the specific embodiments illustrated is intended or should be inferred. It should be understood that all such modifications and improvements have 2. The composition as claimed in claim 1, comprising:
   a. pinoxaden in the range of 1 to 12.5% w/w;
   b. carfentrazone-ethyl in the range of 1 to 5% w/w;
   c. at least one herbicide compound selected from fenoxaprop-p-ethyl in the range from 5 to 20% w/w and isoproturon in the range from 40 to 60% w/w; and
   d. one or more excipients.

3. The composition as claimed in claim 2, wherein the composition is selected from a group consisting of:

4.5% w/w of pinoxaden, 2% w/w of carfentrazone-ethyl, 10% w/w of fenoxaprop-p-ethyl and one or more excipients;

9% w/w of pinoxaden, 4% w/w of carfentrazone-ethyl, 20% w/w of fenoxaprop-p-ethyl and one or more excipients; and 4.5% w/w of pinoxaden, 2% w/w of carfentrazone-ethyl, 50% w/w of isoproturon and one or more excipients.

4. The composition as claimed in claim 1, wherein the composition is formulated as capsule suspension (CS), dispersible concentrate (DC), dustable powder (DP), powder for dry seed treatment (DS), emulsifiable concentrate (EC), emulsifiable granule (EG), emulsion water-in-oil (EO), emulsifiable powder (EP), emulsion for seed treatment (ES), emulsion oil-in-water (EW), flowable concentrate for seed treatment (FS), granules (GR), micro-emulsion (ME), oil-dispersion (OD), oil miscible flowable concentrate (OF), oil miscible liquid (OL), oil dispersible powder (OP), suspension concentrate (SC), suspension concentrate for direct application (SD), suspo-emulsion (SE), water soluble granule (SG), soluble concentrate (SL), spreading oil (SO), water soluble powder (SP), water soluble tablet (ST), ultra-low volume (ULV) suspension, tablet (TB), ultra-low volume (ULV) liquid, water dispersible granules (WG), wettable powder (WP), water dispersible powder for slurry seed treatment (WS), water dispersible tablet (WT), a mixed formulation of CS and SC (ZC) or a mixed formulation of CS and SE (ZE), a mixed formulation of CS and EW (ZW).

5. The composition as claimed in claim 4, wherein the composition is formulated as ME and WP.

6. The composition as claimed in claim 1, wherein the excipient is selected from the group consisting of:

dispersing agent present in an amount in the range from 1 to 10% w/w;

wetting agent present in an amount in the range from 1 to 10% w/w;

emulsifier present in an amount in the range from 5 to 15% w/w;

defoamer present in an amount in the range from 0.1 to 5% w/w;

safener present in an amount in the range from 1 to 5% w/w;

co-solvent present in an amount in the range from 5 to 10% w/w; and at least one of solvent or filler present in an amount of quantity sufficient to make 100% w/w formulation.

7. The composition as claimed in claim 6, wherein:

the dispersing agent is selected from the group consisting of sodium salt of naphthalene sulphonate condensate, sulfonated aromatic polymer sodium salt, sodium polycarboxylate, ethanesulfonic acid, 2-[methyl[(9Z)-1-oxo-9-octadecenyl]amino]-sodium salt, sodium 2-(methyloleoylamino)ethane-1-sulphonate, amine salt of phosphate tristyryl phenol ethoxylated, acrylic copolymer, graft copolymer, salt of naphthalene sulphonate, naphthalene sulfonate formaldehyde condensate, phosphate ester, salt of polycarboxylate, alcohol block copolymer, ethoxylated polyarylphenol phosphate ester, or a combination thereof;

the wetting agent is selected from the group consisting of sodium lauryl sulphate, sodium alkyl naphthalene sulfonate blend, sodium alkylnaphthalenesulfonate, sodium isopropyl naphthalene sulfonate, sodium dioctylsulfosuccinate, ethoxylated polyarylphenol phosphate ester, dioctyl sulphosuccinate, non-ionic ethoxylate, or a combination thereof;

the emulsifier is selected from the group consisting of castor oil ethoxylate, calcium dodecylbenzene sulfonate, blend of anionic-nonionic emulsifiers, tristyryl phenol, polyalkylene oxide block copolymer, high molecular weight polymer polyethylene glycol (PEG)-10, polypropylene glycol (PPG)-5 cetyl phosphate, ethylene oxide (EO)-polyethylene oxide (PO) block copolymer, non-ionic ethoxylated emulsifier, or a combination thereof;

the defoamer is selected from the group consisting of silicon emulsion, dimethyl polysiloxane emulsion, polysiloxane emulsion, or a combination thereof;

the safener is selected from the group consisting of 4-(dichloroacetyl)-1-oxa-4-azaspiro (4.5) decane (AD67), benoxacor, cloquintocet-mexyl, cyometrinil, cyprosulfamide, dichlormid, fenchlorazole-ethyl, flurazole, fluxofenim, furilazole, isoxadifen-ethyl, mefenpyr-diethyl, or a combination thereof;

the co-solvent is selected from the group consisting of 2-ethyl hexanol, n-butanol, dimethylsulfoxide (DMSO), N-methyl-2-pyrrolidone, cyclohexanone, or a combination thereof;

the solvent is selected from the group consisting of naphtha, xylene, decanamide, solvent C9, water, or a combination thereof; and the filler is selected from the group consisting of silica and china clay, or a combination thereof.

\* \* \* \* \*